United States Patent
Cheng et al.

(10) Patent No.: US 10,730,020 B2
(45) Date of Patent: Aug. 4, 2020

(54) EMULSIFICATION ELEMENT AND EMULSIFICATION DEVICE

(71) Applicant: Tamkang University, New Taipei (TW)

(72) Inventors: Tung-Wen Cheng, New Taipei (TW); Su-En Wu, New Taipei (TW); Yi-Chun Lin, New Taipei (TW); Chung-Kai Chang, New Taipei (TW)

(73) Assignee: TAMKANG UNIVERSITY, New Taipei (TW)

( * ) Notice: Subject to any disclaimer, the term of this patent is extended or adjusted under 35 U.S.C. 154(b) by 155 days.

(21) Appl. No.: 15/958,258

(22) Filed: Apr. 20, 2018

(65) Prior Publication Data

US 2019/0099721 A1    Apr. 4, 2019

(30) Foreign Application Priority Data

Oct. 3, 2017    (TW) .............................. 106134272 A

(51) Int. Cl.
| | |
|---|---|
| *B01D 67/00* | (2006.01) |
| *B01D 69/02* | (2006.01) |
| *B01F 5/04* | (2006.01) |
| *B01F 3/08* | (2006.01) |
| *B01F 7/00* | (2006.01) |
| *B01D 71/02* | (2006.01) |

(52) U.S. Cl.
CPC ......... *B01D 67/0041* (2013.01); *B01D 69/02* (2013.01); *B01F 3/0807* (2013.01); *B01F 3/0853* (2013.01); *B01F 5/0473* (2013.01); *B01F 5/0476* (2013.01); *B01F 7/00458* (2013.01); *B01D 71/02* (2013.01); *B01D 2323/08* (2013.01); *B01D 2325/04* (2013.01); *B01D 2325/36* (2013.01)

(58) Field of Classification Search
None
See application file for complete search history.

(56) References Cited

U.S. PATENT DOCUMENTS

| | | | | |
|---|---|---|---|---|
| 4,968,600 A | * | 11/1990 | Haraguchi | ............. B01D 33/68 435/2 |
| 2014/0290195 A1 | * | 10/2014 | Izumi | .................... F01N 3/0222 55/523 |
| 2016/0121272 A1 | * | 5/2016 | Drury | ................. C04B 38/0009 210/650 |

* cited by examiner

*Primary Examiner* — Krishnan S Menon
(74) *Attorney, Agent, or Firm* — Birch, Stewart, Kolasch & Birch, LLP

(57) ABSTRACT

A method for manufacturing a porous membrane includes: mixing silicon carbide powders and a coagulant to form a first mixture; adding a sintering aid to the first mixture to form a second mixture; compressing the second mixture; and sintering the compressed second mixture. More particularly, the coagulant is in an amount of 1% to 3% by weight of the silicon carbide powders and the sintering aid is in an amount of 10% by weight of the first mixture.

4 Claims, 6 Drawing Sheets

EMULSIFICATION ELEMENT AND EMULSIFICATION DEVICE

CROSS-REFERENCE TO RELATED APPLICATION

This non-provisional application claims priority under 35 U.S.C. § 119(a) to Patent Application No. 106134272 filed in Taiwan, R.O.C. on Oct. 3, 2017, the entire contents of which are hereby incorporated by reference.

BACKGROUND

Technical Field

This disclosure generally relates to a membrane emulsification technology and, more particularly, to a porous membrane and a method for manufacturing the same, an emulsification element and an emulsification device.

Related Art

When two immiscible liquid phases (for example, oil and water) are mixed under the action of a surfactant, minute droplets of one liquid phase are uniformly dispersed in the other liquid phase to form an emulsified liquid. The liquid phase providing the droplets in the emulsified liquid is the dispersed phase, while the other liquid phase is the continuous phase. In general, static emulsifiers are commonly used for emulsification. When the two liquid phases come into contact in an emulsification element in a static emulsifier, the droplets formed in the dispersed phase spontaneously detach from the emulsification element into the continuous phase to achieve emulsification.

The membrane emulsification technology is one of the commonly used methods for emulsification using a static emulsifier, which has the advantages of high efficiency, energy saving, simple operations and easy expansion. The physicochemical properties of a membrane have a key influence on the emulsification process. Examples of the membrane used for emulsification include metal oxide membranes, metallic membranes, polymer membranes and micro-engineering membranes. Among them, polymer membranes are easy to acquired and provide a wide range of dimensions, but they fail to resist high-temperature, high-pressure environments, acid and alkali. Compared to organic membranes such as polymer membranes, inorganic membranes such as metal oxide membranes and metallic membranes are more stable under harsh environments. Currently, the commonly used membranes in the emulsification process include porous glass membranes. However, porous glass membranes still suffer from the problems of low dispersed-phase flux and high cost. The main reason for the low dispersed-phase flux is the high hydraulic resistance caused by the symmetrical structure of the membrane. In order to improve the dispersed-phase flux, some researchers have developed a porous glass membrane with an asymmetric structure to reduce the hydraulic resistance. Because the raw material of the porous glass membrane is not easy to acquire, the cost is still high.

SUMMARY

In one embodiment, a method for manufacturing a porous membrane includes:

mixing silicon carbide powders and a coagulant to form a first mixture; adding a sintering aid to the first mixture to form a second mixture; compressing the second mixture; and sintering the compressed second mixture. The coagulant is in an amount of 1% to 3% by weight of the silicon carbide powders and the sintering aid is in an amount of 10% by weight of the first mixture.

In one embodiment, a porous membrane includes silicon carbide powders and a coagulant. The coagulant is in an amount of 1% to 3% by weight of the silicon carbide powders.

In one embodiment, a porous membrane is manufactured using the method of this disclosure.

In one embodiment, an emulsification element includes a porous membrane manufactured using the method of this disclosure.

In one embodiment, an emulsification device includes an emulsification element of this disclosure.

As stated above, the porous membrane according to one embodiment of this disclosure is manufactured by adding a coagulant to silicon carbide powders. When the porous membrane is used for membrane emulsification, it has advantages such as high dispersed-phase flux, less scale formation, high stability, low cost, long service life and easy availability.

BRIEF DESCRIPTION OF THE DRAWINGS

This disclosure will become more fully understood from the detailed description given herein below for illustration only, and thus not limitative of this disclosure, wherein.

DETAILED DESCRIPTION

Figure 1:
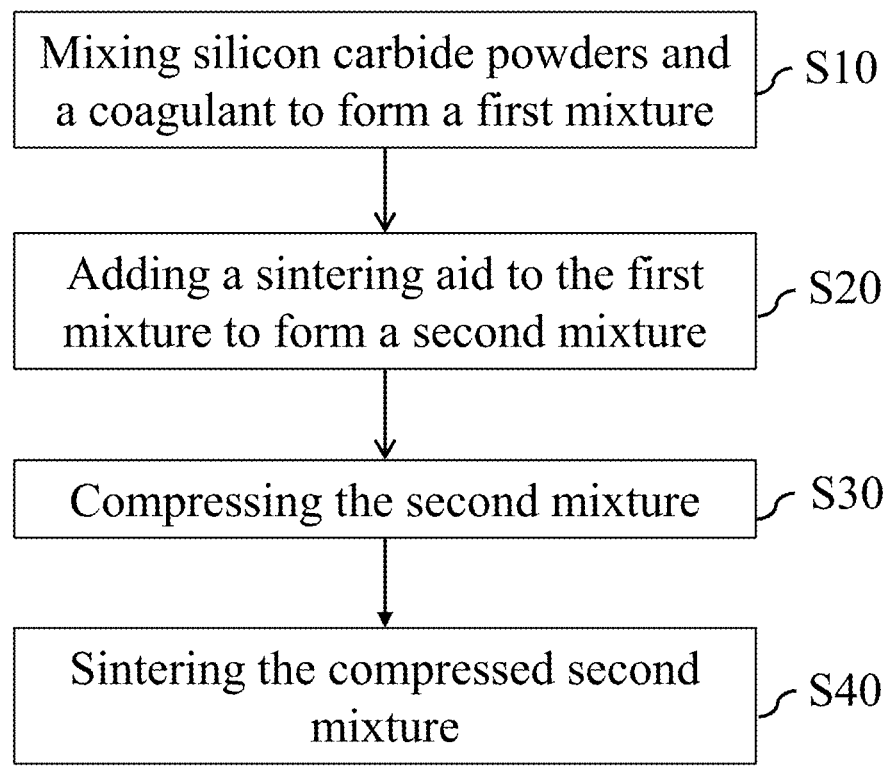
FIG. 1 illustrates a flowchart of a method for manufacturing a porous membrane according to one embodiment of this disclosure.

With reference to FIG. 1, in some embodiments, a porous membrane can be manufactured by the following processes. First, silicon carbide powders and a coagulant are mixed to form a first mixture (Step S10). Next, a sintering aid is added to the first mixture to form a second mixture (Step S20). After the second mixture is compressed (Step S30), at last, the compressed second mixture is sintered (Step S40). Moreover, the coagulant is volatilized from the second mixture to form pores in the second mixture such that a silicon-carbide-based porous membrane is obtained.

In some embodiments, the coagulant may be polyvinyl alcohol (PVA), poly(vinyl butyral) (PVB), other alternative materials, or any combination thereof.

In some embodiments of Step S10, the amount of the coagulant in the first mixture may be 1 wt % to 3 wt % of the silicon carbide powders. In other words, the amount of the coagulant may be 1 wt % to 3 wt % as the amount of the silicon carbide powders is 100 wt %.

In some embodiments of Step S10, the coagulant may first be mixed with a solvent to form a coagulant solution. Moreover, the coagulant solution and the silicon carbide powders are mixed and dried to form the first mixture. In some embodiments, the solvent can he alcohol, other alternative solvents, or any combination thereof. For example, poly(vinyl butyral) (PVB) can be mixed with alcohol in a weight ratio of 1:9 to form a coagulant solution. In other words, when the amount of the silicon carbide powders is 100 wt %, the amount of the coagulant solution composed of PVB and alcohol may be 10 wt % to 30 wt %.

In some embodiments of Step S10, it is possible to sieve after the silicon carbide powders and the coagulant are mixed such that the silicon carbide powders and the coagulant can have a uniform particle size. In some embodiments, the silicon carbide powders may have an average diameter of 38 micrometers (m).

In some embodiments of Step S20, the amount of the sintering aid in the second mixture may be 10 wt % of the first mixture. In other words, the amount of the sintering aid may be 10 wt % as the amount of the first mixture is 100 wt %. Additionally, in some embodiments, the sintering aid may be kaolin or other alternative materials.

In some embodiments of Step S40, the second mixture may be the sintered by one-step sintering or two-step sintering, preferably, one-step sintering. Additionally, when the second mixture is sintered by one-step sintering, the sintering temperature may be 1300° C. to 1400° C., and the sintering time is 13 hours.

In some embodiments, the average pore dimension in the porous membrane can be 1 to 3 micrometers.

In some embodiments, the porous membrane may be hydrophobic or hydrophilic, preferably hydrophilic.

In some embodiments, an emulsification device employing a membrane emulsification technique may include an emulsification element having the porous membrane described above. In some embodiments, the emulsification element may be configured mostly by such a porous membrane and have other minute amounts of additives or components that do not affect the emulsification procedure. In some embodiments, the emulsification element may have such a porous membrane only.

Figure 2:
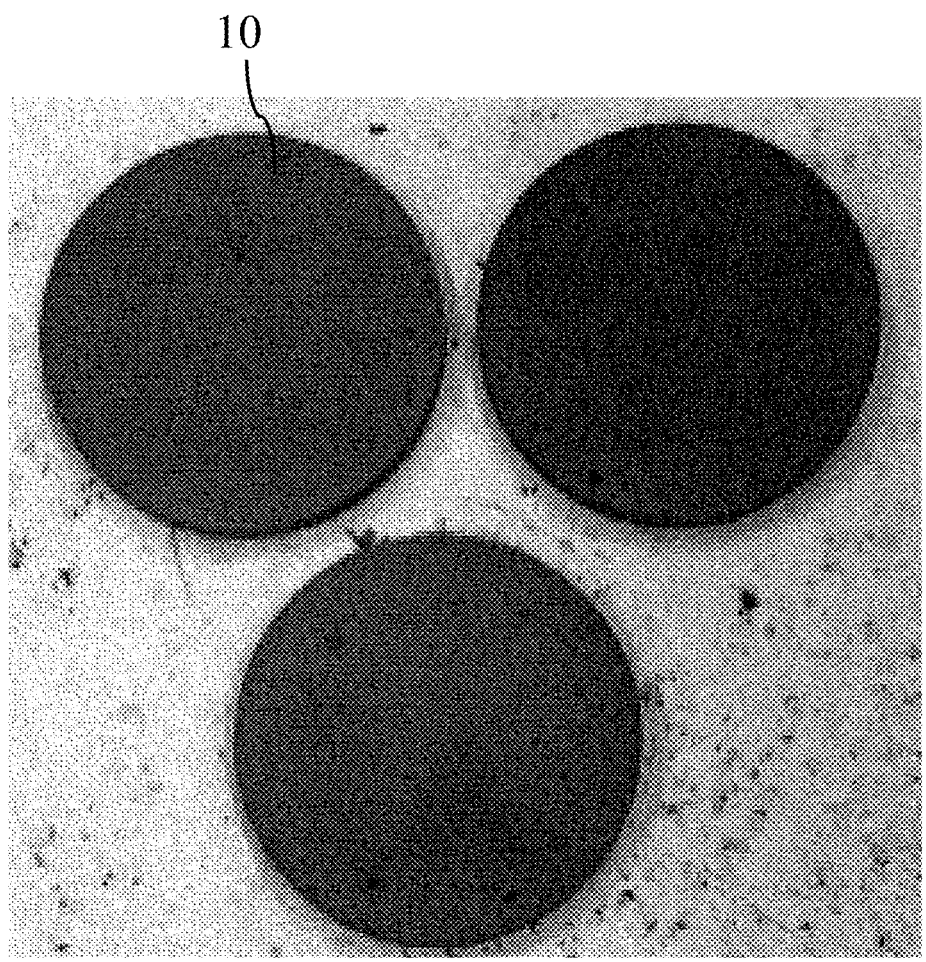
FIG. 2 illustrates the appearance of porous membranes according to one embodiment of this disclosure.

For example, PVB can be mixed with alcohol, added to the silicon carbide powders and then dried to form a first mixture. The first mixture can be sieved using a sieve shaker such that the first mixture contains silicon carbide powders and coagulant having a uniform particle diameter. Additionally, kaolin can be added to the first mixture and sieved again using a sieve shaker to form a second mixture. Next, after the second mixture is compressed at 400 kg/cm³ to 500 kg/cm³ using a compressing machine, the compressed second mixture is sintered at 1300° C. to 1400° C. for about 13 hours in a furnace. During the sintering process on the second mixture, the coagulant is burned and removed from the second mixture such that a plurality of pores is formed in the second mixture. Here, a circular hydrophilic film (i.e., the porous membrane 10) having a diameter of 38.7 mm and a thickness of 3 mm can be obtained, the appearance of which is shown in FIG. 2. The weights of various components such as silicon carbide powders, PVB (i.e., the coagulant), alcohol solution (i.e., coagulant solution), and kaolin used in the above processes are shown in Table 1.

TABLE 1

| Group | wt % | silicon carbide powders (g) | poly(vinyl butyral) (PVB) (g) | poly(vinyl butyral) (PVB) alcohol solution (g) | kaolin (g) |
| --- | --- | --- | --- | --- | --- |
| Group 1 | 10 wt % | 20 | 0.2 | 2 | 2.02 |
| Group 2 | 20 wt % | 20 | 0.4 | 4 | 2.04 |
| Group 3 | 30 wt % | 20 | 0.6 | 6 | 2.06 |

Figure 3:
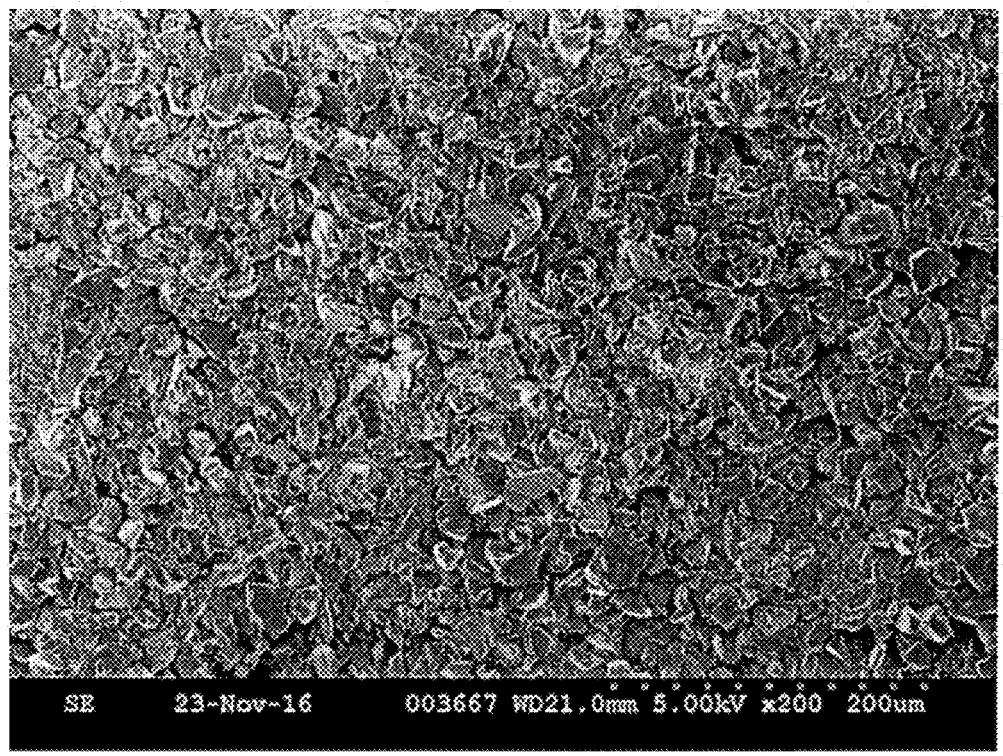
FIG. 3 illustrates the detailed morphology of a porous membrane according to one embodiment of this disclosure.

With reference to FIG. 3, an image illustrating the detailed morphology of a porous membrane 10 taken by scanning electron microscopy (SEM) is shown. From FIG. 3, the larger particles that form the substrate are made of silicon carbide powders, and the pores are formed after PVB is burned off during sintering. When the porous membrane is used as an emulsification element, the pores enable the fluids such as the continuous-phase solution or the dispersed-phase solution to pass therethrough.

Figure 4:
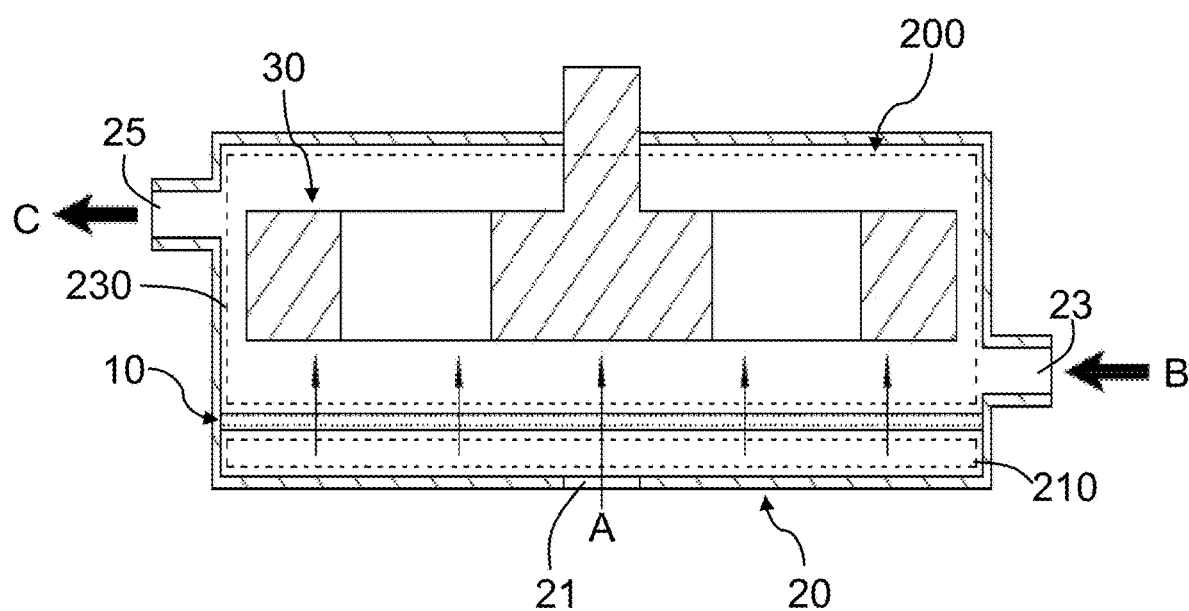
FIG. 4 illustrates a cross-sectional view of an emulsification device and a porous membrane thereof according to one embodiment of this disclosure.

With reference to FIG. 4, the emulsification device may further include a housing 20 and a rotary disk 30. The housing 20 may include a chamber 200. The resulting porous membrane 10 may be used as an emulsification element and disposed in an emulsification device. The porous membrane 10 is capable of dividing the chamber 200 into a first space 210 and a second space 230. The first inlet 21 may be disposed to communicate with the first space 210, while the second inlet 23 and the outlet 25 may be disposed to communicate with the second space 230. The rotary disk 30 may be disposed in the second space 230 and may rotate in the second space 230 when driven by a motor or manually.

Consider that soybean oil is used as a dispersed-phase solution A, and 1% (w/v) sodium dodecyl sulfate (SDS) solution as a continuous-phase solution B. A pressure is applied to the dispersed-phase solution A such that the dispersed-phase solution A enters the first space 210 from the first inlet 21, passes through the pores in the porous membrane 10, enters the second space 230, and forms droplets A1. The continuous-phase solution B enters the second space 230 from the second inlet 23 and is mixed with the droplet-shaped dispersed-phase solution A. The rotary disk 30 rotates, after being driven, to stir and emulsify the mixture of the dispersed-phase solution A and the continuous-phase solution B to form an emulsified solution C.

Figure 5:
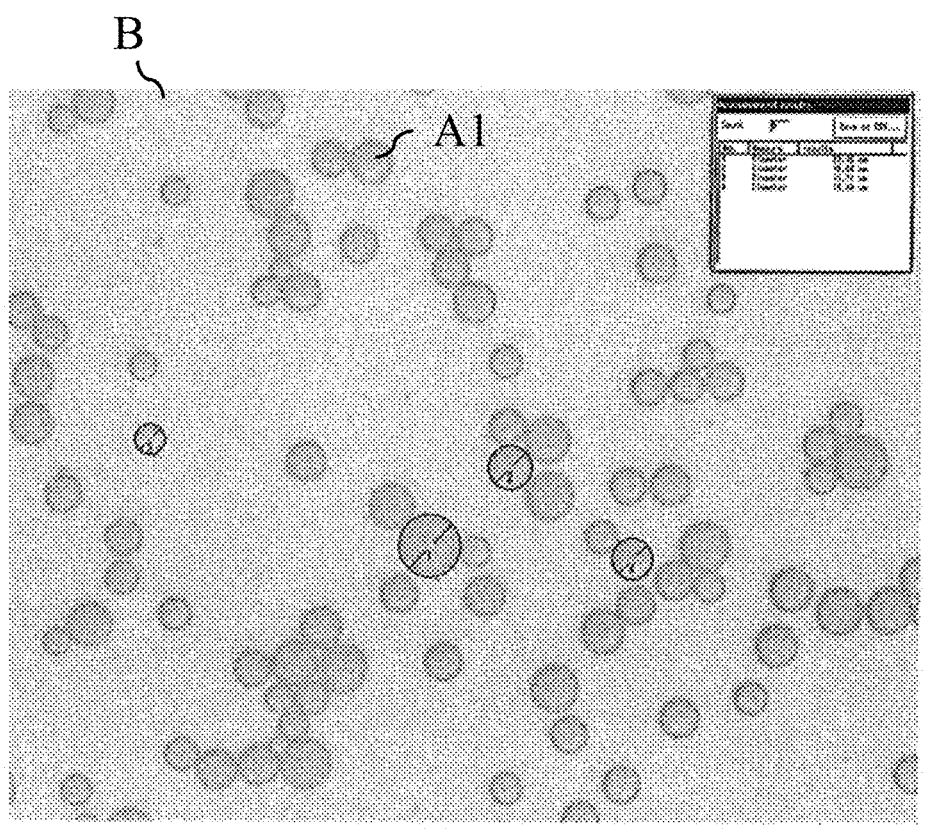
FIG. 5 illustrates a schematic view of droplets formed from a dispersed phase passing through a porous membrane according to one embodiment of this disclosure into a continuous phase.
Figure 6:
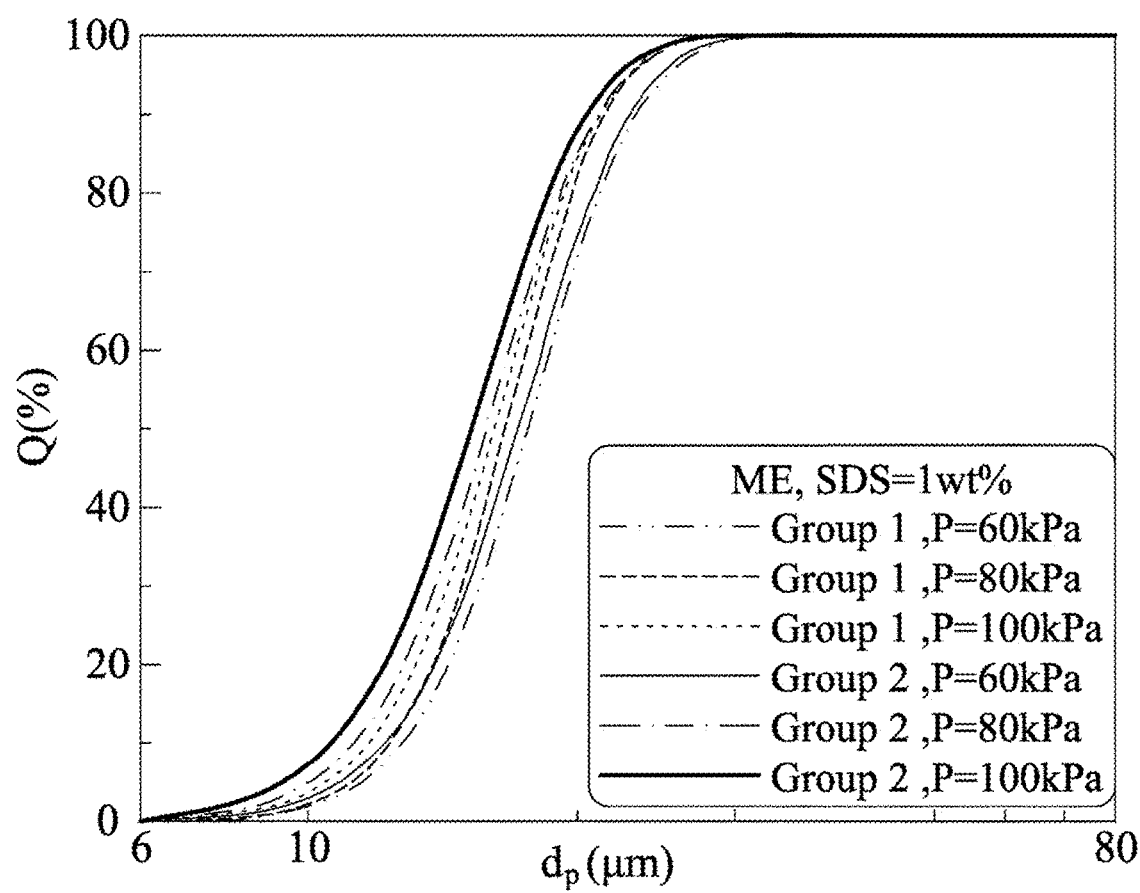
FIG. 6 illustrates a comparison of droplet diameters when a dispersed phase passes through a porous membrane manufactured with different coagulant contents according to one embodiment of this disclosure.

With reference to FIG. 5, it can be seen that the droplets A1 formed after the dispersed-phase solution A (i.e., the soybean oil) passes through the porous membrane 10 are distributed in the continuous-phase solution B (i.e., the SDS solution). As can be seen from the FIG. 5, the resulting droplets A1 are uniformly distributed in the continuous-phase solution B. The droplets Al are high-stability, and have uniform particle sizes. Referring to FIG. 6, the result of the analysis of the particle diameter of the droplets formed when the porous membrane 10 of the first group and the porous membrane 10 of the second group are used for emulsification is shown. In FIG. 6, $d_p$ is the particle diameter of the droplets A1, expressed in micrometers (μm), and Q is the cumulative frequency and is expressed in percentage units. From FIG. 6, during the preparation of the porous membrane 10, the higher the amount of PVB used, the smaller and the more uniform the particle diameter of the droplets formed when a pressure is applied to the dispersed-phase solution A to pass through the porous membrane 10. Additionally, the larger the applied pressure (P) is, the smaller the particle diameter of the droplets is.

As stated above, the porous membrane according to one embodiment of this disclosure is manufactured by adding a coagulant to silicon carbide powders. When the porous membrane is used for membrane emulsification, it has advantages such as high dispersed-phase flux, less scale formation, high stability, low cost, long service life and easy availability.

While this disclosure has been described by the way of example and in terms of the preferred embodiments, it is to be understood that the invention need not be limited to the disclosed embodiments. On the contrary, it is intended to cover various modifications and similar arrangements included within the spirit and scope of the appended claims, the scope of which should be accorded the broadest interpretation to encompass all such modifications and similar structures.

What is claimed is:

1. An emulsification element comprising a porous sintered disc membrane, wherein the membrane comprises a mixture about 90% silicon carbide and about 10% kaolin and wherein the membrane has an average pore dimension in the range of 1-3 microns.

2. The emulsification element according to claim 1, wherein said membrane is hydrophilic.

3. An emulsification device, comprising:
the emulsification element according to claim 1;
a housing comprising a chamber; and
a rotary disk;
wherein the emulsification element is disposed in the emulsification device and divides the chamber into a first space and a second space, a first inlet is disposed to communicate with the first space, a second inlet and an outlet are disposed to communicate with the second space;
wherein the rotary disk is disposed in the second space and rotate in the second space when driven by a motor or manually.

4. An emulsification device, comprising:
the emulsification element according to claim 2;
a housing comprising a chamber; and
a rotary disk;
wherein the emulsification element is disposed in the emulsification device and divides the chamber into a first space and a second space, a first inlet is disposed to communicate with the first space, a second inlet and an outlet are disposed to communicate with the second space;
wherein the rotary disk is disposed in the second space and rotate in the second space when driven by a motor or manually.

* * * * *